Nov. 16, 1948.    G. SHALKHAUSER    2,453,817
TRIPOD
Filed Sept. 12, 1946    2 Sheets-Sheet 1
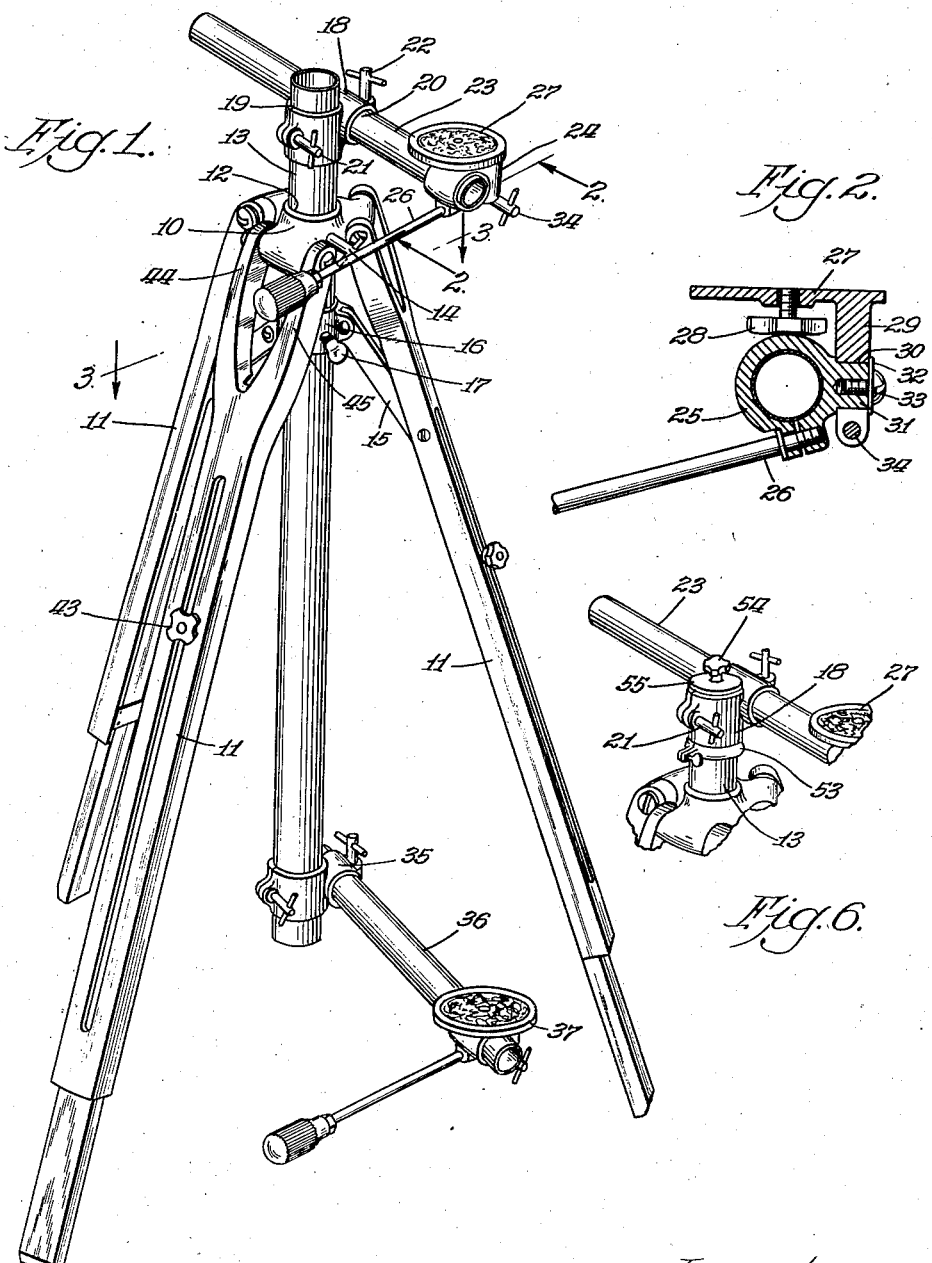
Inventor.
George Shalkhauser
By Mueller and Mason
Attys Nov. 16, 1948.   G. SHALKHAUSER   2,453,817
TRIPOD
Filed Sept. 12, 1946   2 Sheets-Sheet 2
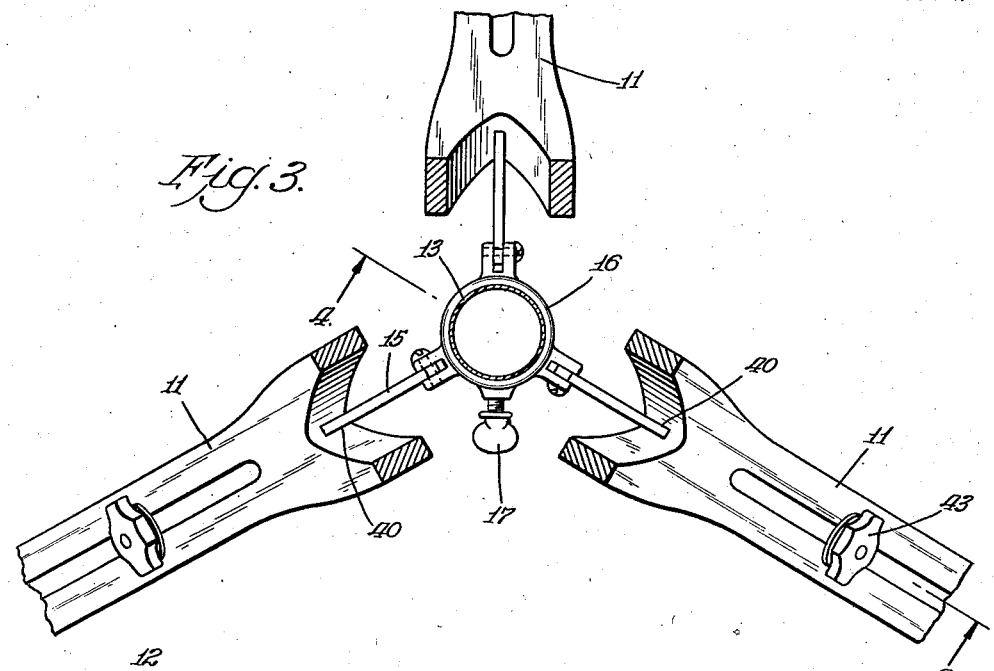
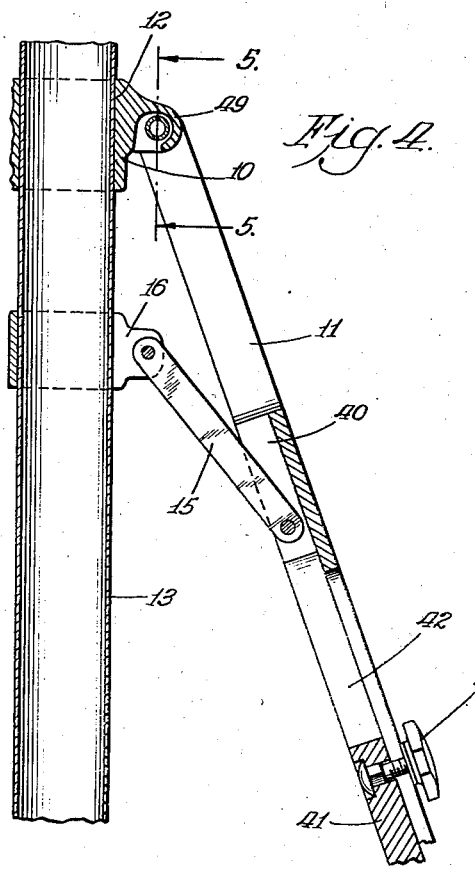
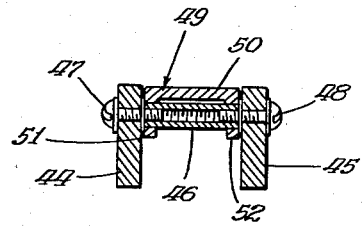
Inventor
George Shalkhauser
By Mueller and Mason
Attys.

Patented Nov. 16, 1948

2,453,817

UNITED STATES PATENT OFFICE 2,453,817

TRIPOD

George Shalkhauser, El Paso, Tex.

Application September 12, 1946, Serial No. 696,440

2 Claims. (Cl. 248—183)

This invention relates generally to tripods and in particular to a tripod adapted to permit mounting of a camera in various desired positions thereon.

It has been customary to use tripods of various types for mounting cameras when it is desired to provide a firm support for a camera which may be easily moved and which is adjustable. However, prior tripods have been objectionable in that in order to change the position of the camera it is necessary that the tripod be bodily moved or the legs thereof adjusted. Also, in prior tripods the camera is positioned directly over the center of the tripod making it difficult in certain instances to position the camera in the desired location because of uneven surfaces on which the tripod must be positioned. Further, the prior tripods have not been entirely satisfactory to provide a support for a camera near the ground as is desirable for taking certain pictures.

It is, therefore, an object of this invention to provide an improved tripod to be used for supporting a camera or other object.

It is an additional object of this invention to provide a tripod which permits freedom of positioning of a camera thereon without changing the position of the tripod itself.

It is a further object of this invention to provide a tripod which forms a sturdy mount for a camera and in which the individual components are of rugged construction.

A feature of this invention is the provision of a tripod having a vertical tubular member adjustably positioned on the main supporting structure and a camera mount adjustably supported on said tubular member to permit positioning of a camera in a great number of positions without moving the main supporting structure of the tripod.

A further feature of this invention is the provision of a tripod in which the camera can be mounted either above or below the supporting member to which the legs of the tripod are secured so that the camera may be mounted very near to the ground.

An additional feature of this invention is the provision of a tripod having a camera mount thereon which is adjustable to permit leveling the camera and swinging the camera from horizontal to vertical positions.

Still another feature of this invention is the provision of a tripod in which bearing members are provided on the legs thereof for pivotally connecting the legs to the main support of the tripod to thereby prevent wear normally encountered when the wooden legs are themselves used as bearings.

Further objects, features and advantages will be apparent from a consideration of the following description taken in connection with the accompanying drawings in which:

Fig. 1 is a perspective view of the tripod in accordance with the invention showing camera mountings positioned both above and below the apex of the tripod;

Fig. 2 is a cross-sectional detailed view of the camera mount along the lines 2—2 of Fig. 1;

Fig. 3 is a cross-sectional view along the lines 3—3 of Fig. 1;

Fig. 4 is a detailed view of the construction of the legs of the tripod;

Fig. 5 is a cross-sectional view of the bearing connection for the legs; and

Fig. 6 shows an attachment to permit swinging the crossarm about the vertical members as required for panning.

In practicing my invention I provide a tripod having legs connected to a main supporting casting. This casting has a circular opening therein to receive a vertically adjustable tubular member, a wing screw being provided for securing the tubular member in a fixed position. A horizontal tubular member is secured to the vertical tubular member by a crosshead which permits the horizontal tubular member to be adjustably positioned with respect to the vertical tubular member. A camera mount is adjustably positioned on the horizontal tubular member and includes provisions for positioning the camera in either a horizontal or vertical position and for leveling the camera in either position without removing the camera from the mount. The legs are provided with adjustable extensions and have bearings secured thereto to provide a pivotal connection between the legs and the main casting.

Referring now more particularly to the drawings the tripod is shown in Fig. 1 as including a main supporting casting 10 to which legs 11 are positioned. The main casting includes a circular opening 12 in which a vertical tubular member 13 is adjustably positioned. A wing screw 14 is provided for fixing the position of the vertical tubular member 13 with respect to the casting 10. For bracing the legs 11 and determining the position thereof, arms 15 are pivotally connected thereto and also connected to a ring 16 surrounding the tubular member 13 below the main casting 10, a wing screw 17 being provided for securing the ring 16 to the tubular member 13. For supporting a camera on the tripod, a crosshead 18 is provided having a pair of split annular clamping surfaces 19 and 20 positioned at right angles with respect to each other and having wing screws 21 and 22 for clamping the same. The clamping surface 19 is adapted to be positioned around the tubular member 13 and the clamping surface 20 is adapted to engage a horizontal crossarm 23. A camera mount 24 is supported on the horizontal crossarm 23 and includes a split clamping ring 25 which is clearly shown in Fig. 2. The screw 26 is provided for tightening the clamping ring 25, and includes a long handle for a purpose to be later explained.

The camera mount includes a plate 27 adapted to receive a camera thereon, a screw 28 being provided to engage the standard mounting threads provided on a camera in a well known manner. The plate 27 has a projection 29 thereon with an opening 30 therein adapted to receive a stud 31 provided on the clamping ring 25. A washer 32 is secured to the stud 31 by a screw 33 to prevent the plate 27 from being removed from the ring 25. The opening 30 is also in the form of a split ring adapted to be clamped by wing screw 34 to thereby fix the position of the plate 27 with respect to the clamping ring 25.

In the tripod illustrated in Fig. 1, a second crosshead 35 is provided positioned on the lower end of the tubular member 13. This crosshead supports a tubular member 36 which in turn supports a camera mount 37. As this crosshead, horizontal crossarm and camera mount are identical to the crosshead 18, horizontal crossarm 23 and camera mount 24, a detailed description of the components will not be repeated. It is apparent that the same crosshead may be used in both positions thus eliminating the need of carrying both. Also the second camera mount 37 may be positioned on the horizontal member 23 opposite camera mount 24 to thereby provide a dual camera mount. The second camera mount can also be used for holding a flash attachment or other equipment as desired.

Figs. 3, 4 and 5 show a detailed construction of the tripod legs and adjusting mechanism therefor. Fig. 3 is a sectional view looking down at a point between the main casting 12 and the ring 16 and shows the arm 15 positioned in slots 40 in the legs 11. Fig. 4 further illustrates the construction of the legs and shows that the legs 11 are provided with extension members 41 positioned in slots 42 in a standard manner. Clamping screws 43 are provided for securing the extensions 41 in a fixed position with respect to the main portion of the legs 11. Fig. 5 illustrates in detail the manner in which the legs are pivotally connected to the main casting 12. The legs 11 are forked at the top providing oppositely disposed portions 44 and 45. A bearing member 46 is secured to these portions by screws 47 and 48 which pass through openings in the opposite portions 44 and 45. The bearing member 46 is, therefore, rigidly secured to the leg portion 11 and does not move with respect thereto. The main casting 12 includes three equally spaced projecting portions 49 which are illustrated in detail in Figs. 4 and 5 as including a bridge portion 50 having end portions 51 and 52 with openings therein to receive the bearing member 46. The bearing member 46 and the casting 12 both being made of metal and having ground engaging surfaces form a pivotal connection between the legs and the casting which will have a small amount of friction and will not wear rapidly.

Fig. 6 illustrates an additional attachment which may be used with the tripod in accordance with this invention to permit swinging of the crossarm 23 as is required for panning. In Fig. 6, the tubular member 13 and crosshead 18 are identical to the corresponding parts in Fig. 1. A collar 53 is removably positioned on the tubular member 15 so that when the thumb screw 21 of the crosshead is loosened the crosshead is supported by the collar and free to turn about the tubular member 13. To prevent vertical movement of the crosshead on the tubular member 13, a fitting 54 is provided which fits into the top of the tubular member 13 and includes a washer 55 flush with the top of the tubular member and engaging the top of the crosshead 18. The fitting 54 may be secured to the tubular member 13 in any desired manner as by threads engaging mating threads provided in the tubular member 13.

It is apparent from the foregoing description that by using the tripod in accordance with the invention it is possible to adjust the position of the camera both vertically and horizontally without moving the tripod bodily or adjusting the position of the legs. That is, the vertical member 13 may be shifted vertically within the casting 10 or the crosshead 18 may be variably positioned on the tubular member 13 to provide a vertical adjustment and the camera mount 24 or the crossarm 23 can be adjusted to change the horizontal position of the camera. This latter adjustment also permits positioning the camera remote from the center of the tripod, thus providing a better position for the camera in locations where the tripod cannot be moved in a particular direction because of an uneven surface. As previously stated, the crosshead may be positioned on the vertical member below the main support of the tripod to thereby provide a mounting for the camera near the ground. Also, a plurality of mounts may be provided on the crossarm to permit the use of more than one camera or to permit the use of a camera and other attachments such as flash attachments.

The camera mount itself allows the camera to be swung from a horizontal to a vertical position, the mounting providing for a swing of more than 90 degrees so that latitude is provided for leveling the camera in either position. By use of the collar 53 as illustrated in Fig. 6 it is possible to swing the camera in an arc in a horizontal plate as is used in panning. The long handle on the adjusting screw for the camera mount facilitates the adjusting of the camera mount so that the camera is directed at the object desired and also provides an easy means for swinging the camera when panning.

The construction of the various components of the tripod is such that a very rigid assembly is provided. The vertical member 13 and the crossarm 23 being of tubular construction are very strong and are not easily bent out of shape. The arms 15 support the legs 11 to provide a very sturdy mounting. The use of bearing members for connecting the legs of the main supporting member of the tripod eliminates wear normally occurring when the legs are pivotally secured by bolts passing through the wooden leg members themselves.

Although I have described various embodiments of my invention, it is apparent that various changes and modifications can be made therein which are within the intended scope of the invention and scope of the invention should be limited only as defined in the appended claims.

I claim:

1. A tripod including a main supporting member having an opening therein, a plurality of legs secured to said member for supporting the same, a vertical member adjustably positioned in said opening and adapted to extend above and below said supporting member, a crosshead adapted to be secured to said vertical member at various positions above and below said supporting member, a horizontal crossarm adjustably supported on said crosshead, and mounting means adjustably supported on said crossarm, said mounting means being adapted for independent swivel movement about the longitudinal axis of said crossarm and being also adapted to turn bodily with the crossarm about said longitudinal axis.

2. In combination with the tripod set forth in claim 1, a collar secured to said vertical member enabling said crosshead to be rotated for swinging said crossarm in a horizontal plane.

GEORGE SHALKHAUSER.

REFERENCES CITED

The following references are of record in the file of this patent:

UNITED STATES PATENTS

| Number | Name | Date |
|---|---|---|
| 581,806 | Bouton | Mar. 4, 1897 |
| 1,517,825 | Bruneau | Dec. 2, 1924 |
| 1,495,458 | Thalhammer | May 27, 1924 |
| 2,124,006 | Parker | July 19, 1938 |
| 2,219,370 | Pierce | Oct. 29, 1940 |

FOREIGN PATENTS

| Number | Country | Date |
|---|---|---|
| 297,502 | Germany | May 2, 1917 |